United States Patent [19]

Ritchie

[11] Patent Number: 4,964,724

[45] Date of Patent: Oct. 23, 1990

[54] RADIATION RECEIVING MAST

[75] Inventor: David S. Ritchie, Glasgow, Scotland

[73] Assignee: Barr & Stroud Limited, United Kingdom

[21] Appl. No.: 407,718

[22] Filed: Sep. 14, 1989

Related U.S. Application Data

[63] Continuation-in-part of Ser. No. 268,455, Oct. 31, 1988, abandoned, which is a continuation of Ser. No. 88,018, Aug. 18, 1987, abandoned, which is a continuation of Ser. No. 788,545, Jun. 26, 1985, abandoned, which is a continuation of Ser. No. 347,018, Jan. 27, 1982, abandoned.

[30] Foreign Application Priority Data

Jan. 27, 1981 [GB] United Kingdom ............... 8102460

[51] Int. Cl.$^5$ .................... G01B 11/26; G02B 23/08; G01C 9/02
[52] U.S. Cl. ................... 356/152; 350/174; 350/540; 356/5; 356/247; 356/251; 356/252
[58] Field of Search ............ 250/330, 334, 342; 358/108, 109, 113; 356/5, 247, 251, 152, 252; 89/41.06; 350/174, 540

[56] References Cited

U.S. PATENT DOCUMENTS

| | | | |
|---|---|---|---|
| 3,549,231 | 12/1970 | Scidmore et al. | 89/41.06 |
| 3,715,953 | 2/1973 | Allan | 89/41.06 |
| 3,997,762 | 12/1976 | Ritchie et al. | 89/41.06 |
| 4,108,551 | 8/1978 | Weber | 356/5 |
| 4,386,848 | 6/1983 | Clendenin et al. | 89/41.06 |
| 4,398,821 | 8/1983 | Steward | 356/152 |

Primary Examiner—Stephen C. Buczinski
Attorney, Agent, or Firm—Finnegan, Henderson, Farabow, Garrett & Dunner

[57] ABSTRACT

A radiation mast such as a periscope has a head end 10 incorporating a radiation receiver in the form of a top mirror 12, the lower end 11 of the mast being physically separated by a considerable distance from end 10 and being provided with an information station, for example, in the form of viewing optics (E) and/or a video monitor 17. The radiation image formed at the receiver 12 is viewed at the information station in accurate superimposition with a reference pattern which is electronically generated by generator 19 and which is stabilized in space with respect to at least pitch, roll and yaw movements of the vehicle on which the mast is mounted. The pattern is also stabilized with respect to such disturbance factors as are effective on the information relaying means, for example, optics in path B, C, D, whereby the radiation image can be visually referenced to the electronically generated pattern, unwanted relative movements having been eliminated. The radiation receiver may also be in the form of a thermal imager 14 the output of which is electrically relayed to the information station and according to the nature of the information relaying means and the disturbance factors incident thereon the reference pattern may be coupled into the radiation image from the radiation receiver at any one of the radiation receiver, relaying means and the information station. The pattern generated by generator 19 may also be so arranged as to have a controlled drift rate in space.

5 Claims, 3 Drawing Sheets

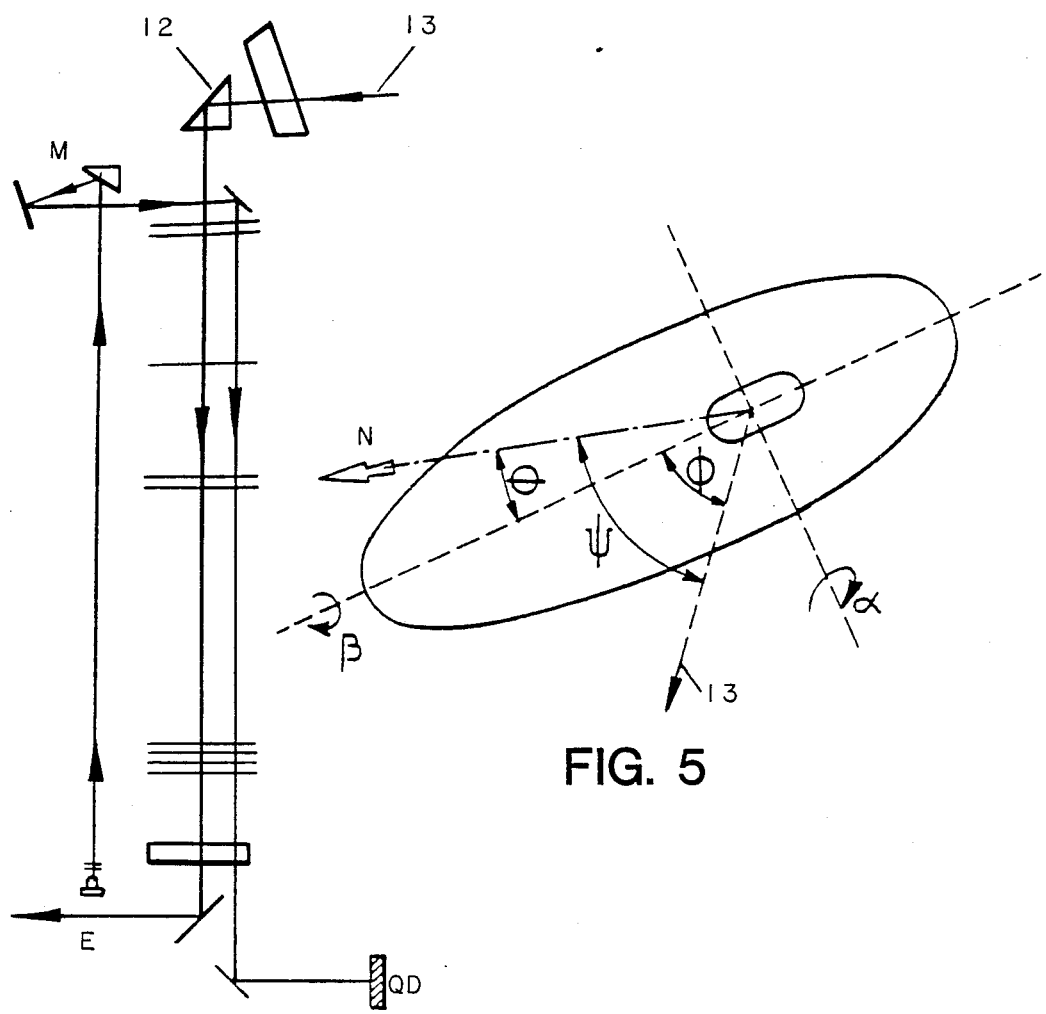
FIG. 3
FIG. 5
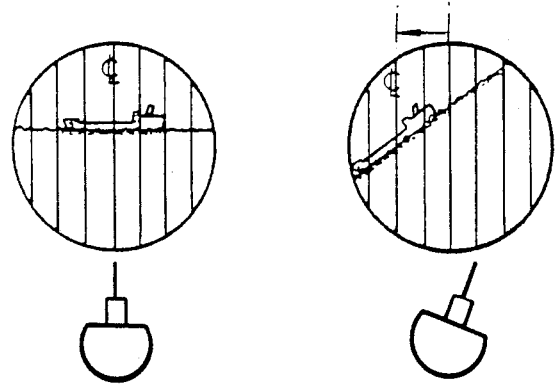
FIG. 4

RADIATION RECEIVING MAST

This application is a continuation-in-part of application Ser. No. 268,455, filed Oct. 31, 1988, now abandoned, which is a continuation of Ser. No. 088,018, filed Aug. 18, 1987, now abandoned, which is a continuation of Ser. No. 788,545, now abandoned filed June 26, 1985, which is a continuation of Ser. No. 347,018, filed Jan. 27, 1982, now abandoned.

This invention relates to masts of the kind comprising a mast head incorporating a receiver of image-forming radiation and means for relaying the receiver output from the mast head to an information station at or near the foot of the mast. Such a mast will be referred to as a mast of the kind aforesaid.

One commonly known form of mast of the kind aforesaid is the conventional periscope which forms an integral part of a moving vehicle, usually a ship such as a submarine. The periscope head carries receiving optics in the form of a mirror for defining a line of sight and for collecting radiation from a field of view and the foot of the periscope carries viewing optics including optical eyepieces through which an operator may witness the field of view. Between the receiving and viewing optics there is mounted an optical telescope system having low overall magnification which is usually of the order of 1.5 to 6.0 × but incorporating a final stage essentially providing high magnification There are various known problems inherent in periscopes which make them difficult to use under normal conditions. Firstly, roll, yaw and pitch movements of the vehicle on which the periscope is mounted together with the overall magnification factor of the telescope system render the image at the viewing optics non-stationary. Secondly, because of the considerable length of the periscope, the upper part of which is without mechanical support, flexure occurs in the periscope especially when the periscope is moving through a surrounding medium and this also contributes to the non-stationary nature of the image at the viewing optics. Thirdly, image movement at the viewing optics is extremely sensitive to flexure of the periscope within its mechanical supports due to the high magnification stage of the telescope system.

Another known form of mast of the kind aforesaid is the optronic mast the mast head of which has a radiation receiver which converts received radiation to electronic form and relay from the mast head to the information station is effected electronically, the information station including an electrooptic converter whereby the image from the field of view may be viewed by an operator. This form of mast also suffers from the disadvantage that the image at the information station is rendered non-stationary due to the effects of mast flexure and roll, yaw and pitch movements of the vehicle on which the mast is mounted.

According to the present invention there is provided a mast of the kind aforesaid wherein the radiation image at the radiation receiver is viewed at the information station in accurate superinposition with an electronically generated reference pattern which is stabilised in space with respect to pitch, roll and yaw movements of the vehicle on which the mast is mounted and with respect to such disturbance factors as are effective on the means for relaying the receiver output to the information station whereby the radiation image can be visually referenced to said pattern, unwanted relative movements having been eliminated.

Superimposition of the reference pattern may be effected adjacent the radiation receiver, in the relaying means or at the information station according to the particular structure employed as will be explained. However, because the reference pattern is stabilised as aforesaid and combined in accurate superimposition with the image formed by the radiation receiver, the scene witnessed by the operator at the information station incorporates a stabilised reference marking or pattern with respect to which the line of sight of the mast can easily be referenced. Thus, if the field of view incorporates a stationary feature, for example a lighthouse, pitch, roll and yaw movements of the vehicle containing the mast will cause that feature to move within the display area of the information station but corresponding movement of the reference pattern will take place so that there is no relative movement of the feature with respect to the pattern.

The present invention also provides for effecting a controlled drift rate of the space stabilised reference pattern, at the information station, the drift rate being operator controlled. This arrangement is particularly useful in establishing the rate of change of bearing of a field of view feature (e.g. a ship) which is a required value in rapidly establishing a velocity vector triangle for the vehicle containing the mast to achieve an intercept or avoid a collision course. Thus it is possible to provide an accurate electronic navigation and target facility in a moving vehicle, particularly a ship or submarine, so that within a very short time interval (of about 5 seconds) the rate of change of target bearing can be assessed. This value is important an warship attack calculations where war conditions impose a very short exposure time (about 10 seconds) for the periscope head of a submarine if the submarine is to remain undetected and prior art techniques have required intermittent observations over several minutes to establish a plotting procedure for evaluation of the variable. The value is also important in navigation to determine whether or not a target ship is on an intercept and collision course this being the situation when the target ship maintains a constant bearing as viewed through the mast.

The reference pattern utilised in the present invention is similar to that described in U.S. Pat. No. 4,404,892, and may take a number of different forms such as a single azimuthally orientated line or series of dots or a plurality of such lines (or dots) spaced apart by a predetermined amount such that at the information station there are say, six to twelve such lines in the display area. The actual azimuthal orientation of the pattern need not be known or set relative to a standard compass bearing datum and indeed in many cases it will be preferable to have the pattern azimuthally adjustable in position by temporary use of the drift rate control prior to any controlled continuous drift therein being implemented. However if the actual azimuthal orientation of the periscope (relative or true) is known the target's bearing (either relative or true) can be identified from the pattern without movement of the periscope itself.

The reference pattern may also take the form of a horizontally orientated line, or pair of lines, or arrangement of dots suitably arranged for setting on a celestial body for use in navigational sight taking. In this case the vertical position of the pattern requires to be stabilizing and known relative to a true horizon reference. The elevation of the receiver line of sight relative to the mast head must also be known but stabilisation thereof is not essential.

In the case where the reference pattern comprises a pair of spaced marks or lines neither vertically or horizontally) these can be used in conventional manner to provide a range estimate or a heading estimate for a target of known dimensions.

Embodiments of the present invention will now be described by way of example with reference to the accompanying drawings in which.

FIG. 3 schematically illustrates a particular sensor which may be used in carrying out the present invention;

FIG. 4 illustrates one form of effect of the present invention as apparent at the information station; and FIG. 5 depicts the various angles referred to herein.

Figure 1:
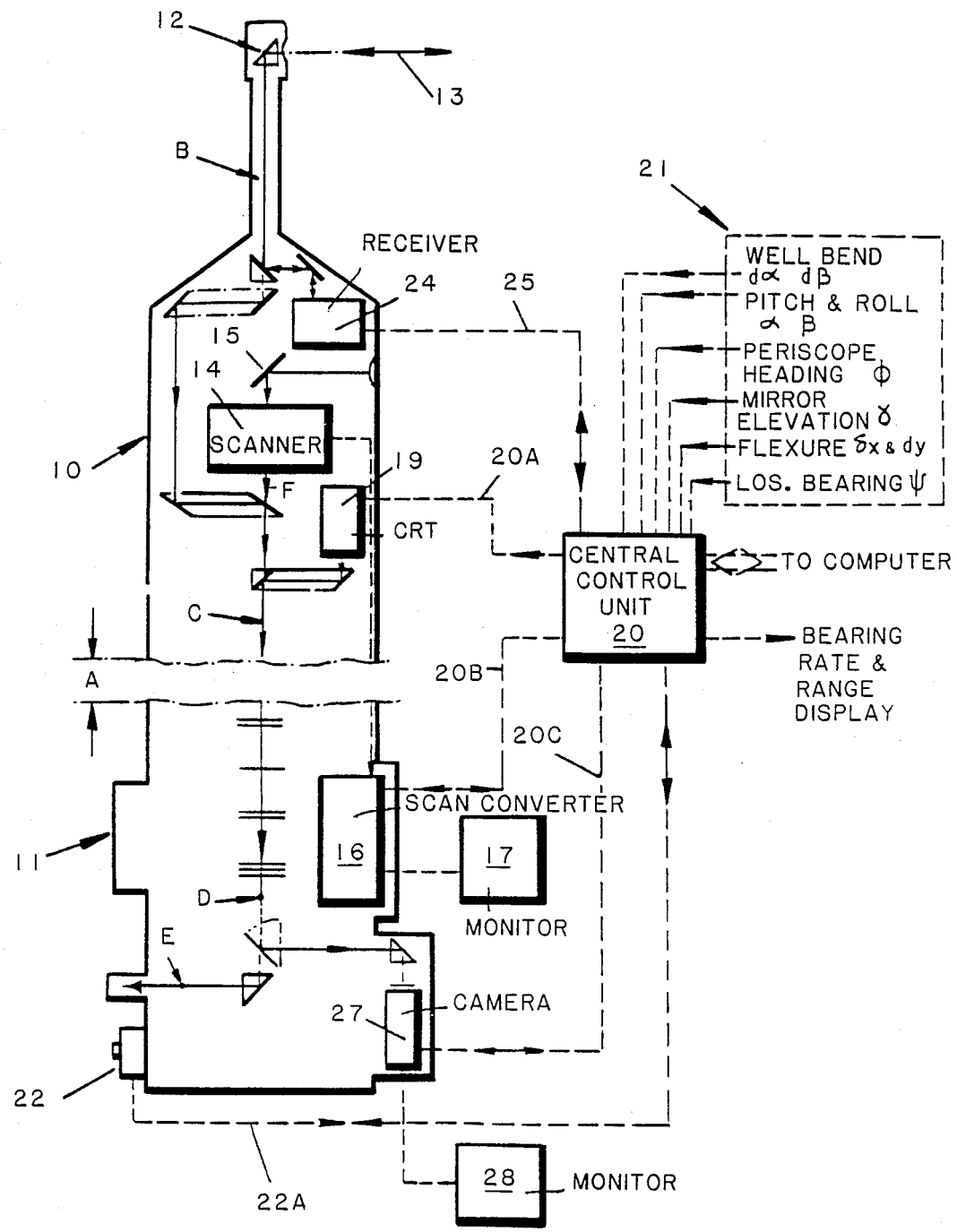
FIG. 1 is a schematic view of a periscope incorporating the various embodiments.

As is shown in FIG. 1 a torsionally rigid periscope incorporates a head or upper end 10 and a bottom or lower end 11 physically separated by a considerable distance which in the interests of clarity is foreshortened and denoted in the drawing as 'A'. End 10 is a rigid assembly in itself and both forms of periscope flexure occur within the dimension A, only the lower part of which is physically supported by bearings as will be explained. End 10 incorporates receiving optics including top mirror 12 which in this case is stabilised against pitch movements of the periscope in the line of sight 13. In the illustrated periscope end 10 also incorporates a thermal imager 14 which receives thermal via a mirror 15 which like mirror 12 is stabilised against pitch movements. The visible radiation reflected by mirror 12 is relayed optically along path B, C, D, E to viewing optics contained in end 11 and the output of image 14 is electrically relayed to a scan converter 16 in end 11 the output of which drives a video monitor 17 which although shown separately from the periscope could be arrangement to be on the periscope and viewed by viewing optics at E if so desired.

It will be appreciated that components 14, 16 and 17 together function to provide a visible scanned-raster display of a thermal scene which is detected by a radiation scanner forming part of imager 14. Component 17 could be adjacent component 14 to provide a visible display to be relayed optically along path F, C, D, E thereby enabling this visual display to be viewed at the eyepiece optics at E either superimposed on or as an alternative to the image provided by mirror 12 at point B.

In another form the thermal imager 14 is directly coupled to an LED display device located at point F so that the converted visible display is transmitted optically along path F, C, D, E.

The illustrated periscope also incorporates an image intensifier and/or low-light camera 27 optically coupled to receive light from point B and having its output coupled to a monitor 28. As illustrated this camera 27 receives its optical input from adjacent point D and monitor 28 is shown separately from the periscope but camera 27 could be located in the periscope head 10 for example at point B and the monitor 28 independently could be located on the periscope to be viewed by viewing optics at E if so desired being either at the foot of the periscope or in the head of the periscope.

It will now be appreciated that the above described periscope is intended to embrace a plurality of embodiments of the present invention in that various alternative forms of radiation receivers have been described, various forms of information stations have been described both on and off the periscope and various forms of relay arrangements between the radiation receiver and the information stations have been described. However, in accordance with the present invention a space-stabilised reference pattern is viewed at at least one information station or superimposition with the image at the radiation receiver and a number of arrangements for achieving this will be illustrated. In conformity with the respective embodiments incorporated in the drawing this reference pattern is superimposed either optically or electronically as will now be explained.

In the illustrated periscope the optical image at point C, emanating either from point B or point F or points B and F together, a superimposed on a reference pattern generated locally by CRT 19 which is under the control of central control unit 20 (output 20A) receiving stabilising inputs from sensors 21 such that the generated pattern is stabilised in space against pitch, roll and yaw movements of the vehicle carrying the periscope. The superimposed images are optically relayed along path C, D, E to the viewing optics. Central control unit 20 further includes output 20B coupled to scan converter 16 whereby the reference pattern is superimposed electronically on the output of scanner 14 as viewed at monitor 17 as an alternative to the CRT 19. Conveniently this electronic superimposition is effected by sending synchronised bright-up pulses to mixer circuitry within the converter 16 irrespective of its location, synchronisation being obtained by extraction of logic signals from the converter 16 (or possiblY from the scanner 14) to produce clock, frame start and line start pulses within unit 20.

The pattern applied by outputs 20A and 20B as described when used for measuring bearings need only be stabilised against pitch, roll and yaw movements of the vehicle on which the periscope is mounted since periscope flexure is equally effective against the image and the superimposed pattern in the first case and is avoided in the second case since the relay along the periscope is electronic. A small correction is required in a manner to be described when measuring elevation due to the tilt of the top mirror 12 relative to the elevation sensor 21.

Control unit 20 further includes output 20C coupled to low-light camera or image intensifier 27 for the purpose of electronic superimposition of the reference pattern but in this instance since the camera 27 collects the visual image at the foot of the periscope and is therefore adversely affected by the two forms of periscope flexure disturbance the reference pattern is additionally stabilised against these effects by means of further stabilising inputs from sensors 21. It will be obvious that when camera 27 is located in the periscope head this additional stabilisation will not be necessary when used for measuring bearings.

In order to provide a controlled drift rate for the pattern an operator control 22 is provided adjacent the viewing optics E, which is coupled via line 22A into unit 20, and in the event that the information station is not on the periscope, for example at remote monitors 17, 28, control 22 would be correspondingly located.

The periscope also comprises a laser rangefinder system incorporating a laser signal transmitter and receiver 24 associated with top mirror 12 (but mirror 15 could be used as an alternative) transceiver 24 being coupled via line 25 to unit 20.

Figure 2:
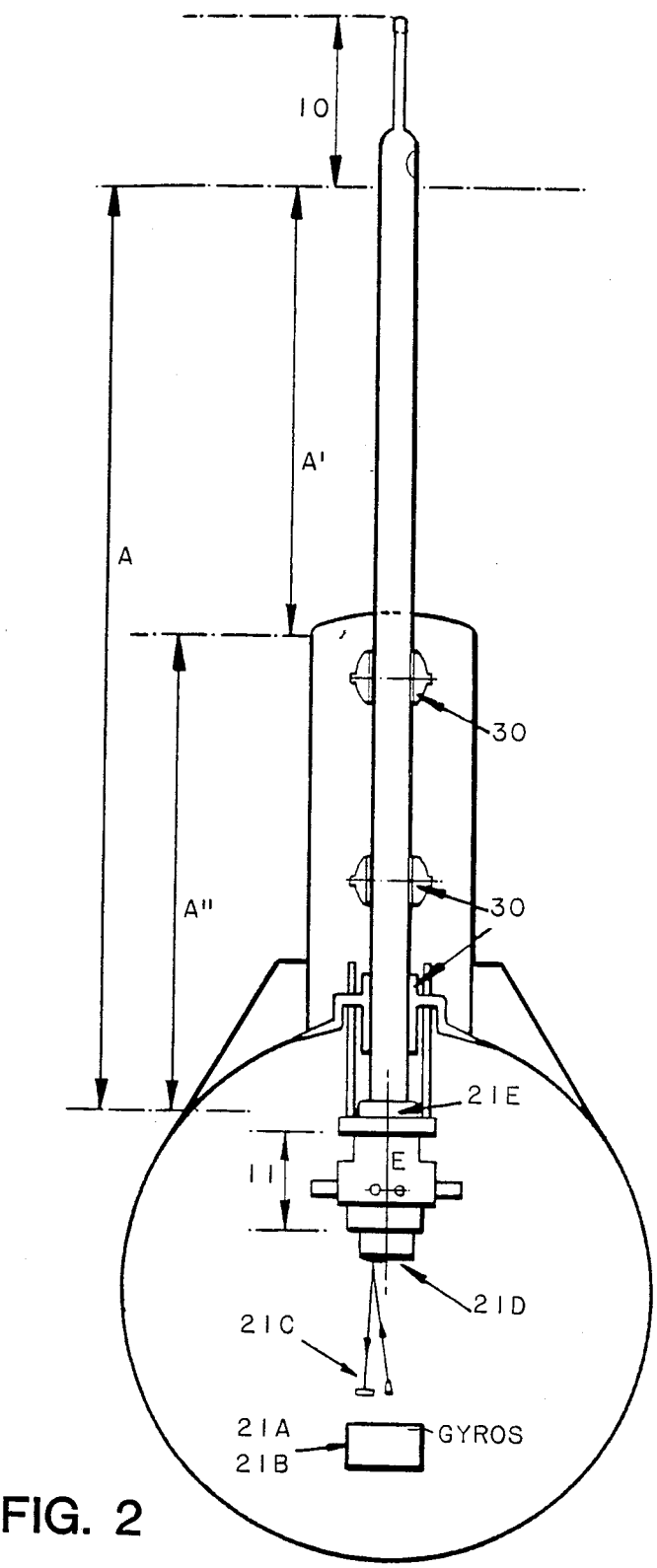
FIG. 2 illustrates further details of a typical periscope.

FIG. 2 schematically illustrates the periscope of FIG. 1 together with its bearings and sensors. Thus it will now be evident that ends 10 and 11 are dwarfed in dimension by part A the upper portion A' of which is entirely unsupported whilst the lower portion A" is typically supported by three bearings 30. Sensors 21 are indicated diagrammatically in FIG. 2 and for pitch and roll may conveniently be gyros 21A, 21B preferably located at the meta centre of the vehicle on which the periscope is mounted but more modern forms of angle sensors such as optical rotation sensors or active laser gyros are suitable for use in a strapped-down role and can therefore be located in any convenient location. Roll motion is conventionally defined as rotation ($\beta$) about the longitudinal fore and aft axis of the vehicle; pitch motion is rotation ($\alpha$) about the transverse athwartship axis; and yaw motion is rotation about the azimuth axis.

Because sensors 21A, 21B are located off the periscope a further sensor 21C is required in this case to measure displacement of the bottom end 11 of the periscope relative to a vehicle datum reference and caused by rigid body movement of the entire periscope within its bearings 30. Sensor 21C is conveniently a quadrature detector and light source with light from the source directed to a mirror on the base of the periscope and reflected to the detector whose output can be interpreted as components of pitch $d\alpha$ and of roll $d\beta$ to be added directly to the pitch $\alpha$ and roll $\beta$ of the vehicle.

Additionally a periscope heading sensor 21E such as an azimuthal encoder on the periscope is used to determine the angle ($\phi$) between the periscope line of sight axis and the longitudinal fore and aft axis of the vehicle. There is no need to measure yaw motion separately as the effect is measured via a periscope line of sight sensor 21D preferably of the gyro type which determines the periscope line-of-sight axis angle ($\psi$) with respect to a fixed direction in space.

Alternatively where a dynamic ships sensor such as a gyro compass is available, for example in a Ship Inertial Navigation System (SINS), separate sensors 21A, 21B and 21D would not be required, the ships sensor or gyro compass effectively providing pitch and roll as well as the angle ($\psi - \phi$). For certain applications the sensor 21D which measures angle $\psi$ does so with respect to a known fixed spatial direction.

Where, as in the above described arrangement the radiation receiver incorporates a mirror stabilised against pitch movements in the periscope line of sight and the reference pattern is azimuthally orientated it becomes necessary only to consider the effect of roll across the line of sight $\beta$ p and it can be shown that $$\beta p = (\beta + d\beta)\cos\phi - (\alpha + d\alpha)\sin\phi$$

and for a periscope of length L and a target in the field of view at range R an azimuthally orientated reference pattern requires to be stabilised in the azimuthal (or X direction) to follow the equation $$X(t) = -K_1 \Delta\psi(t) - K_2 \cdot \frac{L}{R} \beta p(t) \quad (1)$$

Where $\Delta\psi(t)$ represents change of angle $\psi$ due to yaw movement, change of vehicle heading or periscope rotation If the reference pattern is to be drifted at a controlled rate $$\frac{d}{dt} x(t)$$

then equation 1 is augmented by the factor $$\int_o^t \frac{dx(t)}{dt} \cdot dt$$

and in this connection it will be appreciated that the rate of change of target bearing is measurable from the setting of operator control 22 when the drift rate of the reference pattern set by that control matches the drift speed of the target. Stabilisation of the pattern in elevation is not required in this case because top mirror 12 is stabilised and also because the pattern is itself in the form of azimuthally orientated lines.

In order to minimise the effect of movement due to the vehicle carrying the periscope it is preferred that the heading thereof be towards the target. Nevertheless the accuracy with which the bearing rate can be measured in a limited time interval depends on target range and target crossing speed. For example, in 5 seconds a target at 5000 m moving at 20 knots will move about 12 mils across a conventional 8° field of view screen at the information station permitting measurement to within 10%. Of course if several observations are permitted at intervals the bearing rate can be evaluated by the known plotting procedure utilising only range and bearing at each observation.

In the case where the pattern is horizontally orientated and stabilised in elevation (or Y direction) it is necessary to consider the effect of pitch in the line of sight $\alpha p$ and it can be shown that $$\alpha p = (\beta + d\beta)\sin\phi + (\alpha + d\alpha)\cos\phi$$

and stabilisation requires to satisfy the equation $$Y(t) = -K_3 \alpha p(t) \quad (2)$$

Depending upon the form of the reference pattern (for example a pair of short parallel horizontal lines) there may also be stabilisation or compensation for cross-roll by means of a known correction factor $f_y$ which is dependent on elevation $\gamma$ of the line of sight 13 above true horizon. The reference pattern can be made to follow a curved path the curvature of which is dependent on both $\beta p$ and elevation $\gamma$. Thus the factor $f_y (\beta P, \gamma)$ would be applied to equation 2 and a known corresponding factor $f_x (\beta P, \gamma)$ to the azimuthal equation to give $$X(t) = -k_1 \Delta\psi(t) - f_x(\beta P, \gamma) \quad (3)$$

As regards periscope flexure the sensor may comprise a quadrature detector at one end of the periscope and a light projection arrangement at the other end so that the quadrature detector would provide an output of bend angle in the periscope line of sight direction and a bend angle transverse thereto. This system is used when the grid pattern is introduced into the top of the periscope. Additionally a further quadrature detector and light projection arrangement with the light path passing through the periscope telescope system would provide a measure of all contributions to the movement between the periscope first and final focal planes.

However, an alternative and preferred form of flexure sensor arrangement is shown in FIG. 3 for use when the grid pattern is introduced at the bottom of the periscope. Here the light source is adjacent the viewing optics E cf the periscope and light from the source is transmitted directly to a mirror M adjacent top mirror 12 then reflected from mirror M through the optical components of the periscope to quadrature detector QD at the bottom of the periscope in order to provide a combined measure of correction for bend at the top of the periscope and correction for the movement between the first and final focal planes of the periscope. The outputs of QD provides correction factors $-K_4\delta x$ and $-K_4\delta y$ which are added to each of equations 1, 2 and 3.

By way of illustration FIG. 4 illustrates one form of reference pattern superimposed upon a field of view incorporating a ship, and FIG. 5 illustrates the various angles referred to herein.

What is claimed is:

1. A radiation receiving mast adapted to be mounted on a vehicle comprising a mast head having a image-forming radiation receiver, an information station at or near the foot of the mast, means for relaying the radiation image from the receiver to the information station, means for generating electronically a reference pattern which is stabilized in object space with respect to pitch, roll and yaw movements of the vehicle on which the mast is mounted and with respect to disturbance factors acting on the means for relaying the radiation image to the information station and means for superimposing the radiation image received from the radiation receiver on the reference pattern at the information station whereby the radiation image can be visually referenced to said pattern so that unwanted relative movements can be eliminated.

2. The mast of claim 1, wherein the reference pattern is coupled into the radiation image from the radiation receiver at the radiation receiver, the relaying means, or the information station.

3. The mast of claim 2, wherein means are provided for effecting a controlled drift rate of the reference pattern at the information station.

4. The mast of claim 1, wherein the pattern is arranged to permit measurement of horizontal or vertical angles subtended by a target.

5. The mast of claim 1, wherein the radiation receiver provides a radiation image of a celestial body and the reference pattern is stabilized in elevation relative to a true horizon reference.

* * * * *